(12) United States Patent
Igaki

(10) Patent No.: US 8,422,025 B2
(45) Date of Patent: Apr. 16, 2013

(54) OPTICAL ENCODER FOR OBTAINING DISPLACEMENT INFORMATION OF OBJECT

(75) Inventor: Masahiko Igaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 321 days.

(21) Appl. No.: 12/869,106

(22) Filed: Aug. 26, 2010

(65) Prior Publication Data

US 2011/0063622 A1    Mar. 17, 2011

(30) Foreign Application Priority Data

Sep. 11, 2009    (JP) .................................. 2009-210607

(51) Int. Cl.
*G01B 9/02*    (2006.01)
*G01B 11/02*    (2006.01)
*G01D 5/34*    (2006.01)

(52) U.S. Cl.
USPC ....................... 356/488; 356/499; 250/231.18

(58) Field of Classification Search .................. 356/488, 356/499; 250/231.14–231.18
See application file for complete search history.

(56) References Cited

U.S. PATENT DOCUMENTS 5,576,537 A    11/1996    Holzapfel et al.

FOREIGN PATENT DOCUMENTS

JP    3045452 B2    5/2000

*Primary Examiner* — Gregory J Toatley
*Assistant Examiner* — Dominic J Bologna
(74) *Attorney, Agent, or Firm* — Rossi, Kimms & McDowell LLP

(57) ABSTRACT

An optical encoder includes a light source 10, a scale 20 disposed so as to face the light source, a light receiving element 31 configured to receive luminous flux from the light source through the scale, and a signal processing circuit 39 configured to process an output signal of the light receiving element. A light emitting window 11 of the light source is constituted of a collection of a plurality of point light sources and has a shape which meets a predetermined expression.

6 Claims, 13 Drawing Sheets

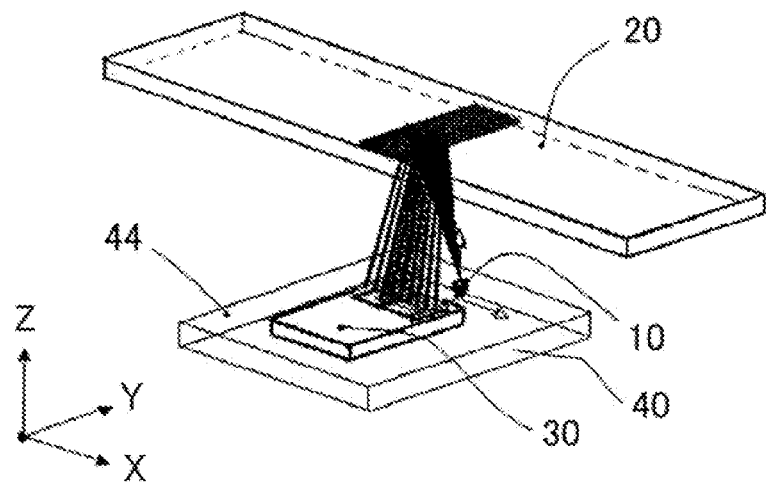
FIG. 1A
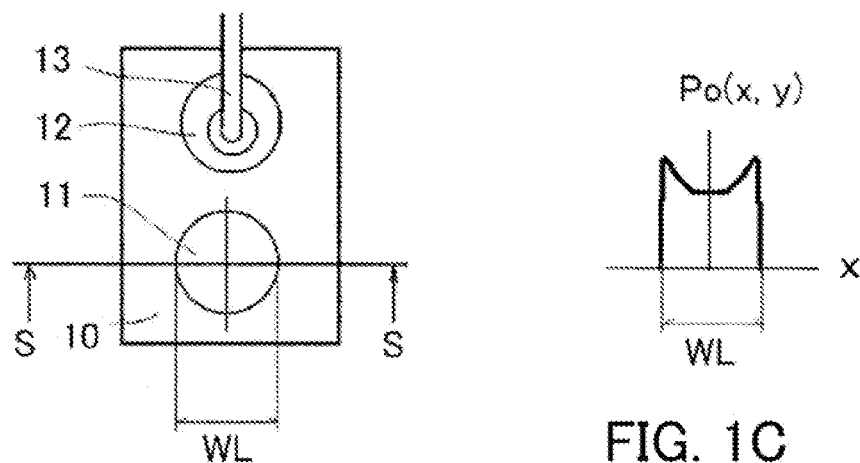
FIG. 1B
FIG. 1C
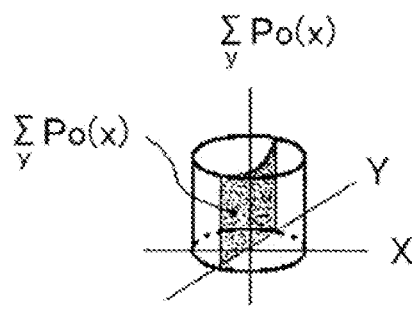
FIG. 1D
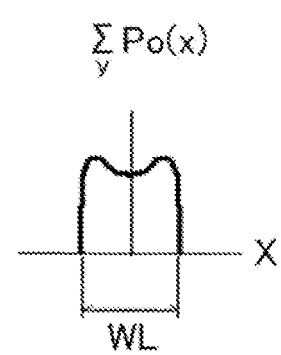
FIG. 1E

OPTICAL ENCODER FOR OBTAINING DISPLACEMENT INFORMATION OF OBJECT

BACKGROUND OF THE INVENTION

1. Field of the Invention

The present invention relates to an optical encoder.

2. Description of the Related Art

A triple grating measurement system (an optical encoder) has been conventionally used as a displacement measuring apparatus for obtaining displacement information of an object. The optical encoder can be downsized by adopting an optical element such as a laser diode (LD), a vertical cavity surface emitting laser (VCSEL), and an LED as its light source.

However, the characteristic of the laser diode or the vertical cavity surface emitting laser significantly is changed in accordance with a temperature change, and also has a problem that it is easy to be damaged by electrostatic discharge, it is very expensive, or the like. In addition, since luminous flux from the light source has high coherency, a lot of harmonic distortion components are contained in an output signal waveform. On the other hand, in the LED, spatial coherency is low and the distortion of the harmonic is small since a light emitting size is large, but it is difficult to obtain the amplitude of a fundamental wave signal. Recently, as a light source having a small light emitting window and being a high power, a current confinement-type LED becomes popular, and the spatial coherency is improved and detection at high resolution is possible.

In the optical encoder, various kinds of methods of eliminating a waveform distortion of a harmonic have been conventionally proposed. However, in a method of eliminating harmonic components having different orders at the same time by using one section, it is difficult to effectively eliminate the waveform distortion component and a remaining component is generated. Therefore, with respect to a harmonic component of each order, there is a method of applying different eliminating sections for each order.

In Japanese Patent No. 3045452 discloses a method of setting widths of a light transmissive portion and a non-transmissive portion of a second scale and a third scale to be a ratio capable of eliminating harmonics having N and N+1 orders, respectively, to eliminate distortion components of the orders that are to be eliminated by being divided by a first scale and the third scale. In the method disclosed in Japanese Patent No. 3045452, harmonics having different orders can be eliminated by the second scale and the third scale, respectively. Therefore, an optimum eliminating condition can be assigned for the harmonic component having each order, and a highly-accurate interpolation division signal can be obtained.

However, when the second scale is provided integrally with a light source to be downsized, a distortion component cannot be effectively eliminated and it is difficult to perform position detection with high accuracy because a light intensity distribution in the light emitting window of the light source is nonuniform. If the third scale is configured integrally with a light receiving element, it is necessary to arrange a lot of light receiving windows closely to each other in order to obtain a plurality of phase difference signals (for example, four-phase signals of A+, B+, A−, and B−). In this case, a distortion of the waveform caused by crosstalk of a plurality of signal sources or an offset error deteriorates the position detection accuracy of the encoder.

SUMMARY OF THE INVENTION

The present invention provides a small-sized and highly-accurate optical encoder.

An optical encoder as one aspect of the present invention includes a light source, a scale disposed so as to face the light source, a light receiving element configured to receive luminous flux from the light source through the scale, and a signal processing circuit configured to process an output signal of the light receiving element. A light emitting window of the light source is constituted of a collection of a plurality of point light sources and has a shape which meets a predetermined expression.

Further features and aspects of the present invention will become apparent from the following description of exemplary embodiments with reference to the attached drawings.

BRIEF DESCRIPTION OF THE DRAWINGS

FIGS. 1A and 1B are configuration diagrams of an optical encoder in Embodiment 2.

FIGS. 1C to 1E are characteristic diagrams of an optical encoder in Embodiment 2.

DESCRIPTION OF THE PREFERRED EMBODIMENTS

Figure 2A:
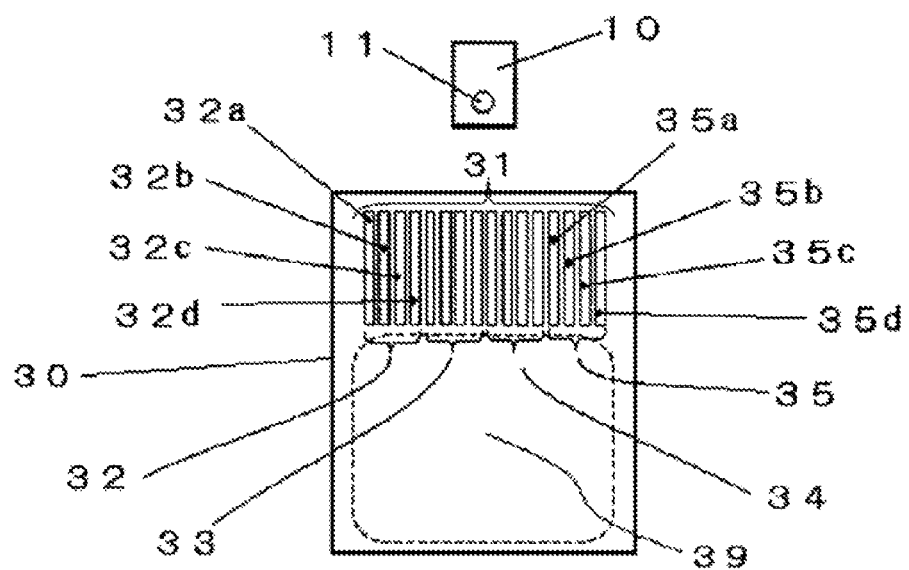
FIGS. 2A to 2C are configuration diagrams of a photo IC element in Embodiment 2.

Exemplary embodiments of the present invention will be described below with reference to the accompanied drawings. In each of the drawings, the same elements will be denoted by the same reference numerals and the duplicate descriptions thereof will be omitted.

First of all, a detection principle of a triple grating measurement system (an optical encoder) in the present embodiment will be described. The triple grating measurement system of the present embodiment includes three (scale) gratings of first to third scales. In the present embodiment, particularly, it is preferable that a light source and a light receiving element are configured integrally with the second scale and the third scale, respectively. In the triple grating measurement system, generally, an optimum pitch of each grating and its relative position relation are given based on the following expressions (1) to (3).

$$PG1/PG2 = V/(U+V) \quad (1)$$

$$PG1/PG3 = U/(U+V) \quad (2)$$

$$1/U + 1/V = \lambda/(n \cdot (PG1)^2) \quad (3)$$

In the above expressions, PG1, PG2, and PG3 are pitches of a first scale G1, a second scale G2, and a third scale G3, respectively. U and V are a distance between the first scale G1 and the second scale G2 and a distance between the first scale G1 and the third scale G3, respectively. Furthermore, $\lambda$ is a light-emitting central wavelength of the light source, and n is an arbitrary natural number (n: 1, 2, 3, . . . ).

A transmissive type and a reflective type are known as a displacement detecting type of the triple grating measurement system, and the reflective type is more advantageous and has more examples than the transmissive type. In the configuration of the reflective type, particularly, because the relationship of U=V is met, the above Expression (3) is transformed as the following Expression (4).

$$V = U = 2 \cdot n \cdot (PG1)^2/\lambda \quad (4)$$

Expression (4) is a general expression which provides substantial optimum grating pitch and optimum arrangement of each grating (the first to third scales) in the reflective type configuration of the triple grating measurement system.

Figure 4A:
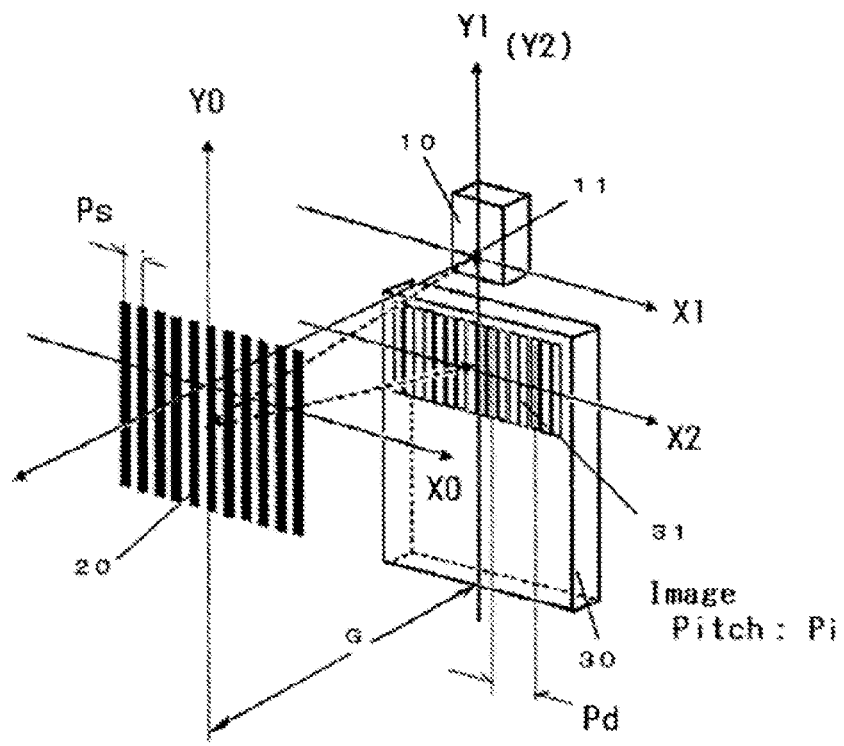
FIGS. 4A and 4B are configuration diagrams of a triple grating measurement system in the present embodiment.
Figure 4B:
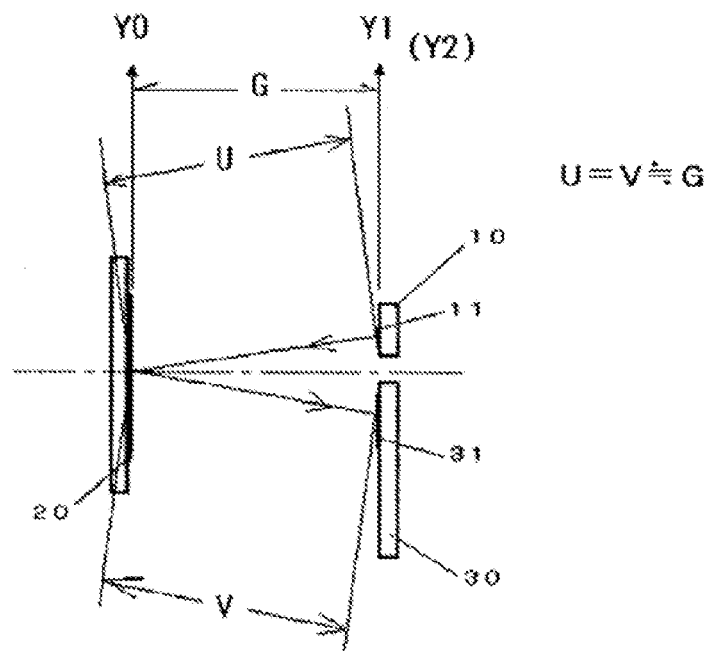

Next, referring to FIGS. 4A and 4B, the configuration of the triple grating measurement system in the present embodiment will be described. FIG. 4A is a main perspective view of the triple grating measurement system of the reflective type. A reflective scale 20 corresponds to the first scale G1 described above, which is arranged so as to face a light source 10. A light emitting window 11 of the light source 10 corresponds to the second scale G2. A light receiving element portion 31 (a light receiving window) of a photo IC element 30 corresponds to the third scale G3. FIG. 4B is a main cross-sectional view of the triple grating measurement system including axes Y0 and Y1, and symbol G denotes a distance (a gap) between a coordinate axes Y0 and Y1. In the triple grating measurement system of the present embodiment, with respect to the displacement of the gap G, the relationship of V=U($\cong$G) is always maintained. Therefore, according to the above Expressions (1) and (2), even if the gap G is displaced, an optimum condition of 2×PG1=PG2=PG3 is always met as a grating pitch of each scale. Particularly, in Expression (4), when symbol n is a natural number (n=1, 2, 3, . . . ), an interference pattern with high contrast having a fundamental cycle of Pi is formed on the light receiving element (the third scale). In this case, the fundamental cycle Pi of the interference pattern is equal to the grating pitch PG3 of the third scale, and an interference pattern having a cycle configuration twice as long as that of the first scale is obtained.

Figure 5A:
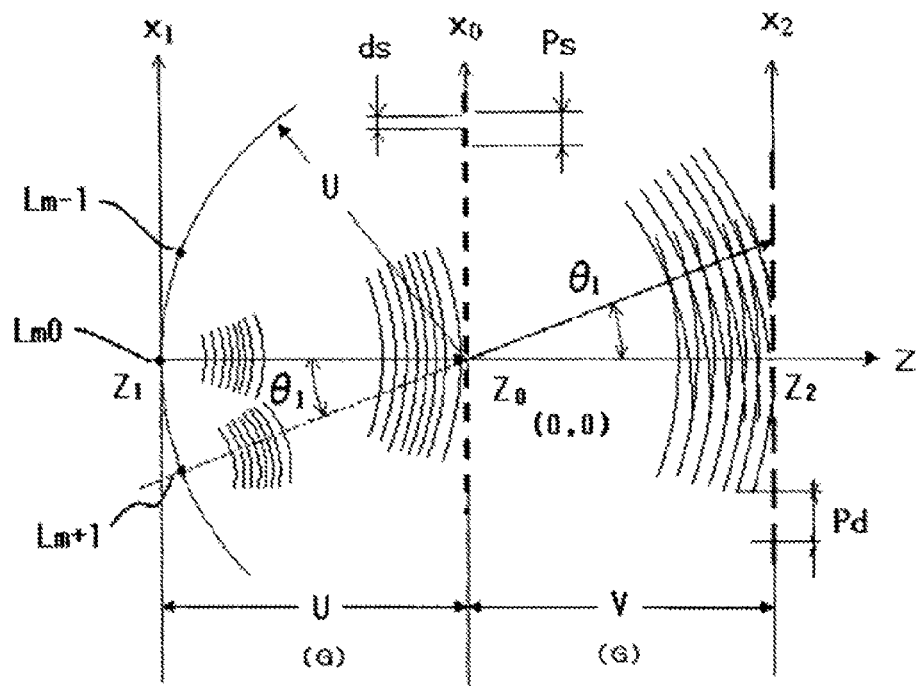
FIGS. 5A and 5B are diagrams illustrating an equivalent optical system of a triple grating measurement system in the present embodiment.

FIG. 5A is a diagram illustrating an equivalent optical system of the triple grating measurement system illustrated in FIG. 4A. A displacement measuring direction is defined as an X-axis direction, and X0-, X1-, and X2-axes correspond to the first scale, the second scale, and the third scale, respectively. Relating to FIG. 4A, a moving direction axis of the reflective scale 20 is arranged on the X0 axis, a surface of the light receiving element portion 31 is arranged on the X2 axis, and the light emitting window 11 of the light source 10 is arranged on the X1 axis. The distance U between the axes X0 and X1 and the distance V between the axes X0 and X2 represent an optical path length from the light emitting window 11 of the light source 10 to the reflective scale 20 and an optical path length from the reflective scale 20 to the light receiving element portion 31, respectively, illustrated in FIG. 4B. The relationship of U=V is met with respect to the distances U and V, each of which is substantially the same length as the gap G. In the drawing, a traveling direction of the light is defined as a common Z axis.

Next, referring to FIG. 5A, a characteristic of light intensity distribution formed on the light receiving element portion 31 of the triple grating measurement system and a spatial frequency component contained in the characteristic distribution will be described. In the equivalent optical system in FIG. 5A, the light emitting window 11 of the light source 10 is considered to be a collection of a lot of infinitesimal point light sources of monochromatic light, and attention is focused on a point light source Lm0 that is m-th one point of them. When a diffraction grating surface (a rectangular amplitude-type diffraction grating) of the reflective scale 20 disposed on the axis X0 is irradiated by a divergent spherical wave which is centered at the point light source Lm0 positioned on the axis X1, a lot of diffracted waves are generated due to a diffraction phenomenon. A Fourier image (an interference pattern having a cyclic intensity distribution) is formed in a space area where the plurality of diffracted waves are overlapped.

Light reaching an original point (x0, z0)=(0, 0) of the axis X0 on the grating surface of the reflective scale 20 from the point light source Lm0 is diffracted at an angle of $\theta 1$ (an angle of $\theta 1$ in FIG. 5A) to reach the light receiving element portion 31. In the embodiment, the diffracted light beam is extended in a direction opposite to a traveling direction of the light, and an intersection with a circle having radius U (=V) which is centered at the original point (0, 0) on the axis X0 is defined as Lm+1. In this case, the diffracted light divided by the diffraction grating in a direction of the angle $\theta 1$ travels while forming the same divergent spherical wave as that of the light wave obtained by virtually arranging a point light source at a position of the point Lm+1.

Figure 5B:
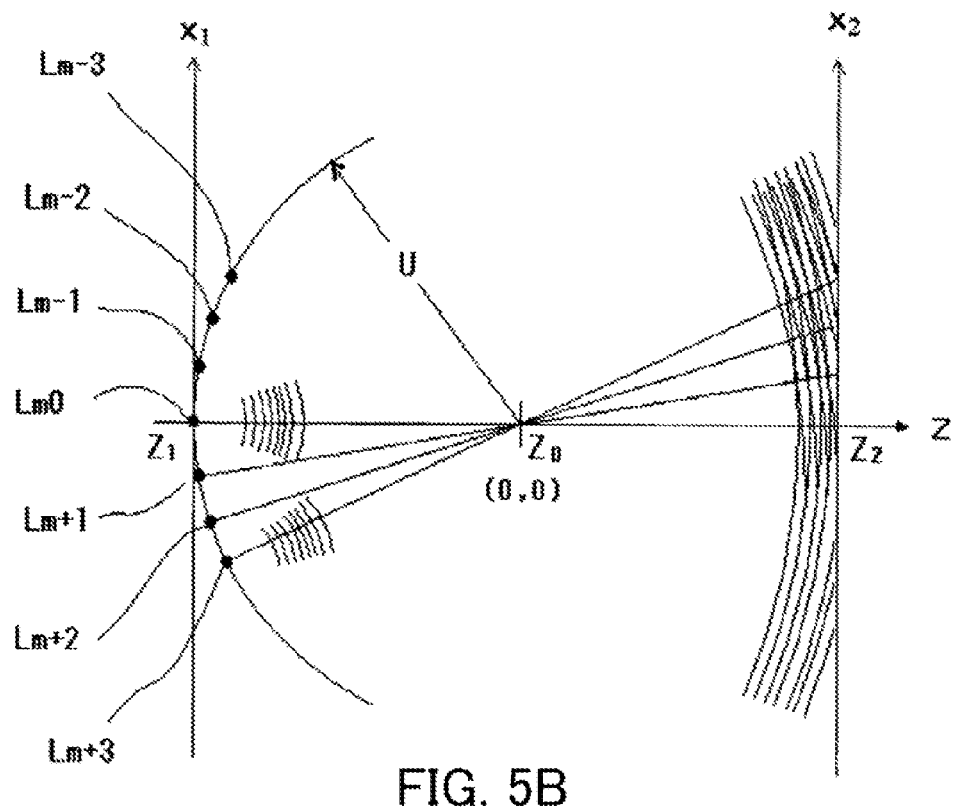
Figure 6A:
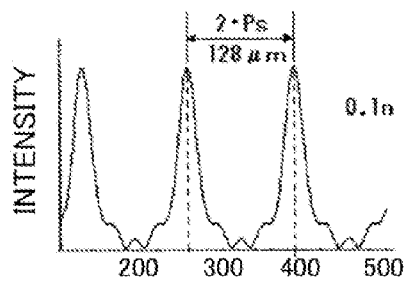
FIGS. 6A to 6J are diagrams of light intensity distributions on a surface of a light receiving element in the present embodiment.
Figure 6F:
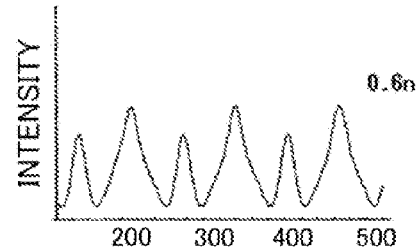
Figure 6B:
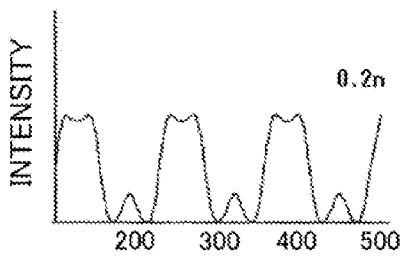
Figure 6G:
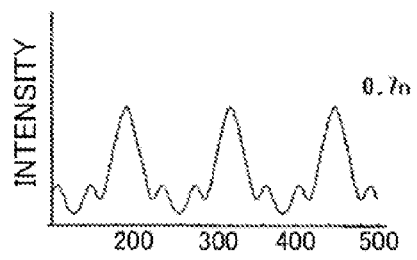
Figure 6C:
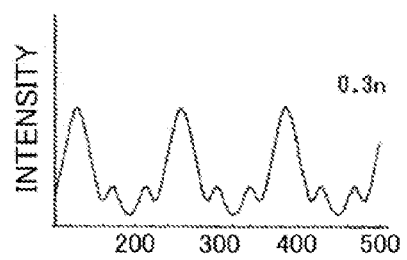
Figure 6H:
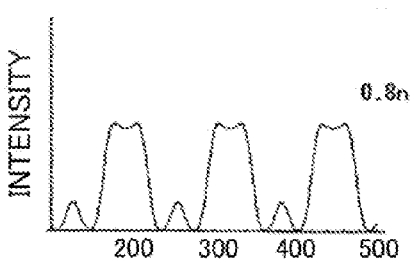
Figure 6D:
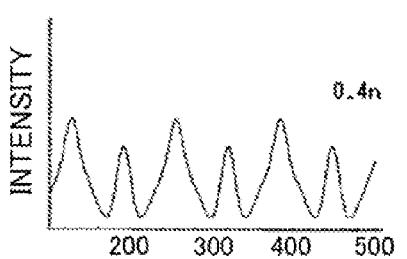
Figure 6I:
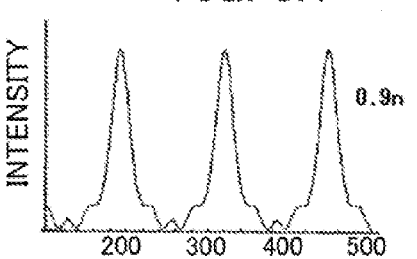
Figure 6E:
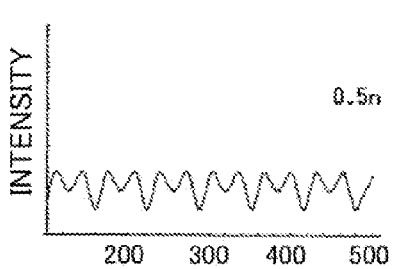
Figure 6J:
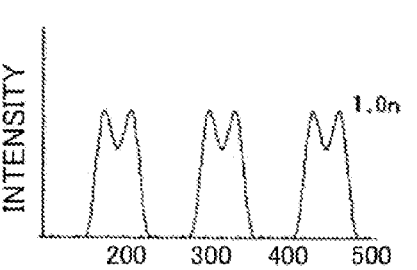

In order to obtain an intensity distribution of a Fouler image on the light receiving surface disposed on the axis X2, a virtual point light sources are arranged at Lm+1, Lm−1, Lm+2, Lm−2, Lm+3, Lm−3, and the like, on a circumference of the circle with radius U which is centered at the original point (0, 0) on the axis X0 (see FIG. 5B). The light intensities of the virtual point light sources are given as equivalents to the diffracted light intensity calculated from a diffraction efficiency of each diffraction order.

As diffracted light which is generated on the grating surface of the reflective scale 20, the intensity of the light wave of the diffracted light having fourth or more order is extremely small. Therefore, considering a spherical wave of the diffracted lights of only seven waves having 0 and ±1 to ±3 orders, and respective spherical waves are represented as u0, u1p, u1m, u2p, u2m, u3p, and u3m (p: plus, m: minus). Complex conjugates of the respective spherical waves are defined as uu0, uu1p, uu1m, uu2p, uu2m, uu3p, and uu3m. In this case, a synthetic wave amplitude f1 and its complex conjugate f2 are represented as the following Expressions (5) and (6), respectively.

$$f1=u0+u1p+u1m+u2p+u2m+u3p+u3m \quad (5)$$

$$f2=uu0+uu1p+uu1m+uu2p+uu2m+uu3p+uu3m \quad (6)$$

An interference image from the diffraction grating on the first scale is obtained by a product of the synthetic wave amplitude f1 and the complex conjugate f2. Therefore, when the m-th point light source Lm0 is defined as an ideal point light source (PS: Point Source) and its light intensity is defined as Pom(x1, z1), an intensity distribution I_ps(x2, z2, p, d, λ) of light in an X-axis direction on the light receiving element surface on the axis X2 is represented by the following Expression (7).

$$I\_ps(x2, z2, p, d, \lambda) = Pom(x1, z1) \times \\ I(x1, x2, z2, p, d, \lambda) \\ = f1 \times f2 \quad (7)$$

In the above expression, d is an opening width of the grating of the first scale (ds in the drawing), p is a grating pitch of the first scale (Ps in the drawing), and λ is a light-emitting central wavelength of the light source. Furthermore, x1 is an x-coordinate of the light source surface (X1, FIG. 5B), x2 is an x-coordinate of an observing surface (X2, FIG. 5B), and z2 is a z-coordinate of an observing surface (Z2, FIG. 5B). Expression (7) is a result of introducing the intensity distribution of the light on the light receiving element surface on the axis X2 when the diffraction grating (the rectangular amplitude-type diffraction grating) which corresponds to the reflective scale 20 disposed on the axis x0 is irradiated.

Next, referring to FIGS. 6A to 6J, a light intensity distribution and higher-order harmonic components contained in the distribution will be described. FIGS. 6A to 6J are results obtained by the calculation of light intensities I (X2, Z2) using Expression (7). In the embodiment, the calculation is performed on conditions that the first scale is irradiated by divergent luminous flux from the point light source Lm0 disposed at an original point of the axis X1 (X1=0), a pitch P (Ps) of the first scale is 64 μm, a central wavelength λ of the light source is 0.65 μm, and an opening width d (ds) of the diffraction grating is 32 μm. In FIGS. 6A to 6J, a value of n in Expression (4) are used as a value of Z2 which is equal to a gap (=−Z1), and the light intensity distributions in an X2-axis direction on the light receiving surface in a range of 0.1n to 1.0n are illustrated. As illustrated in FIGS. 6A to 6J, because a lot of diffracted light components having higher-orders are superimposed, various kinds of harmonic components are contained. As a result, a spatial intensity distribution of the light changes depending upon the gap Z.

Based on the calculation result, the intensity distribution of the interference pattern formed on the light receiving element surface indicates that the interference pattern having a cycle (=128 μm) twice as long as the grating pitch Ps (=64 μm) of the reflective scale 20 is formed as a fundamental cycle Pi. When the reflective scale 20 is changed by one pitch of the grating, the interference pattern on the light receiving element surface is moved by the cycle (=128 μm) twice as long as the grating pitch.

When a laser diode (LD) or a vertical cavity surface emitting laser (VCSEL) having coherency is used as the light source 10, the light source can be treated as a single point light source disposed at its beam waist position. When the point light source is replaced with the point Lm0 described above, the above Expression (7) can be applied as it is. Therefore, an intensity distribution I_laser(x2, z2, p, d, λ) of the light on the light receiving element surface of the axis X2 is represented as the following Expression (8), where Pom(x1, z1) is a light intensity of the point light source Lm0.

$$I\_laser(x2,z2,p,d,\lambda)=Pom(x1,z1) \times I(x1,x2,z2,p,d,\lambda) \quad (8)$$

Figures 7A, 7B:
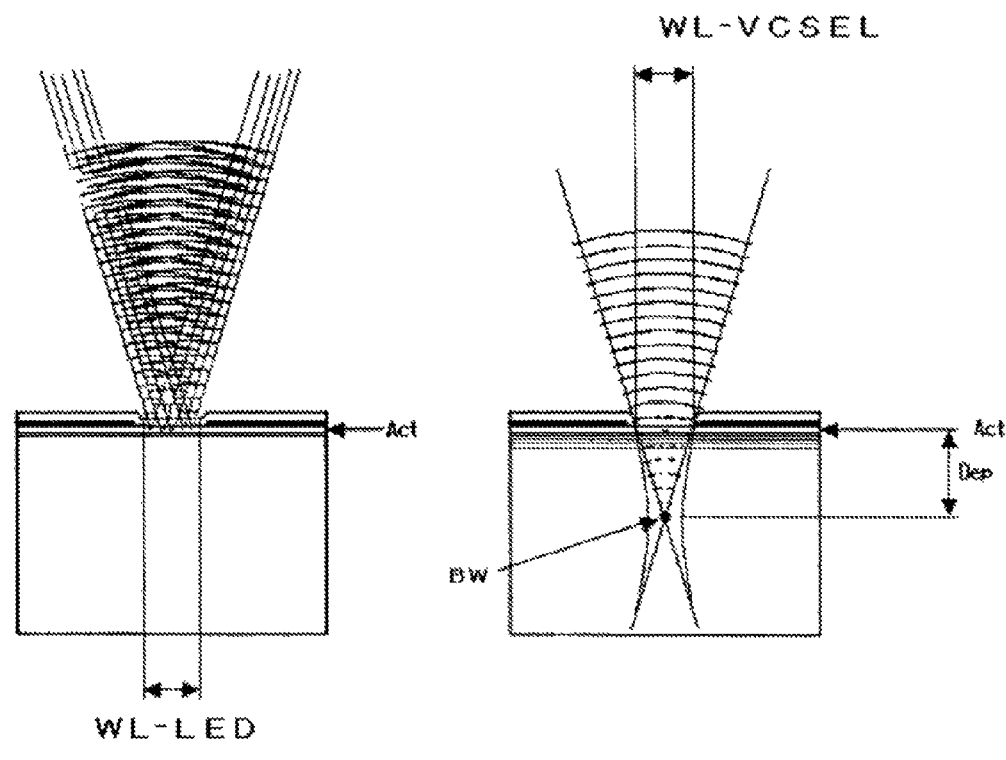
FIGS. 7A and 7B are cross-sectional diagrams of a light source in the present embodiment.

FIG. 7B is a cross-sectional view of the vertical cavity surface emitting laser (VCSEL) as a light source in the present embodiment. BW is a substantial beam waist, and Act indicates a position of an active layer. FIG. 7B illustrates a wave front of emitted light at the lasing time, and the wave front in phase for a whole surface of the light emitting window WL-VCSEL is formed to be emitted. In this case, the position of the beam waist BW exists at a deep area by a distance Dep with reference to the active layer Act of the vertical cavity surface emitting laser. Therefore, the point light beam Lm0 in the equivalent optical system in FIG. 5A is considered to be disposed at the position of the beam waist BW. When the vertical cavity surface emitting laser (VCSEL) is used, the distance U is measured with reference to the beam waist BW instead of the active layer Act.

On the other hand, when a current confinement-type LED is used as the light source 10, it is considered that the light emitting window 11 having a finite size is constituted of a collection of countless point light sources and that there is no coherency among the point light sources. Therefore, unlike the case of the vertical cavity surface emitting laser, the size or the shape of the light emitting window 11 and the light intensity distribution significantly influence the contrast of the interference pattern and the generation of the harmonic component on the light receiving element surface.

When the current confinement-type LED is used as the light source, the light intensity distribution on the light receiving element surface is represented by integrating the intensity of the interference pattern on the light receiving element surface for the entire light emitting window 11. Specifically, as illustrated in FIG. 7A, the light source is treated as a point light source group in which point light sources of a monochromatic light are distributed on the light emitting window WL-LED of the active layer Act of the current confinement-type LED and light waves having different initial phases are independently emitted from the light emitting window WL-LED. Therefore, using Expression (7), the sum of the intensity in each light intensity distribution on the light receiving element surface, which is formed by each point light source included in the light emitting window 11, is calculated.

When the current confinement-type LED is used as the light source 10, the relationship between the light intensity distribution of the light source and the light intensity distribution on the light receiving element surface is represented as the following Expression (9), where Pom(x1, z1) is a light intensity of the point light source Lm0 dotted in the light emitting window 11.

$$I\_led(x2,z2,p,d,\lambda)=\int Pom(x1,z1) \times I(x1,x2,z2,p,d,\lambda)dx1 \quad (9)$$

Figure 9A:
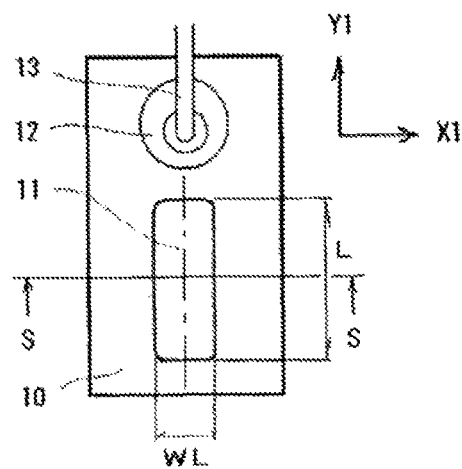
FIGS. 9A to 9H are diagrams of light intensity distributions of current confinement-type LEDs in the present embodiment.
Figure 9E:
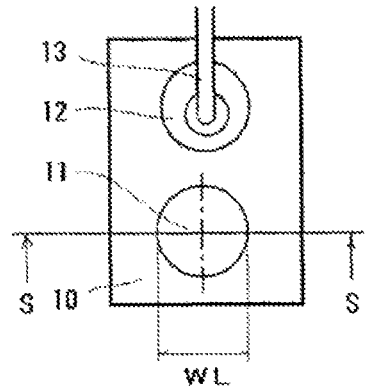
Figure 9B:
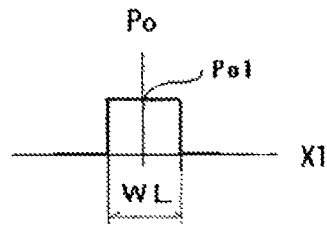
Figure 9F:
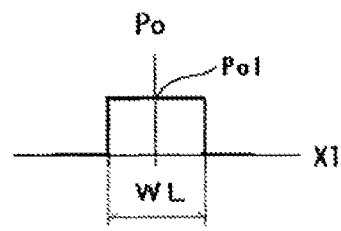
Figure 9C:
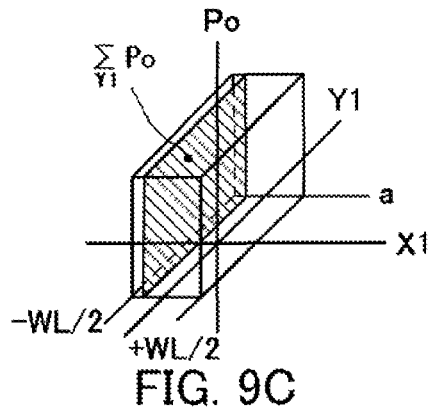
Figure 9G:
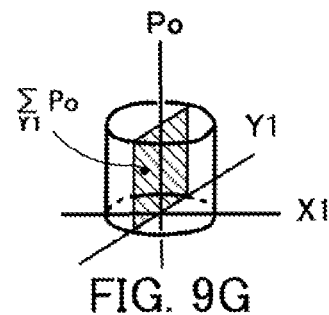

FIGS. 9A to 9H are explanatory diagrams of the light intensity distributions of the current confinement-type LEDs in the present embodiment. FIGS. 9A to 9D illustrate a case where the shape of the light emitting windows 11 of the current confinement-type LED is rectangular, and FIGS. 9E to 9H illustrate a case where the shape of the light emitting windows 11 of the current confinement-type LED is circular. FIGS. 9B and 9F illustrate near-field light intensity distributions on S-S cross section in FIGS. 9A and 9E, respectively, and FIGS. 9C and 9G are perspective views illustrating the light intensity distributions of the light emitting windows 11. As illustrated in FIGS. 9B and 9F, the light intensity Pom in each light emitting window 11 has a uniform distribution Po1, which is represented by the following Expression (10).

$$Pom(x1,y1,z1)=Po1 \qquad (10)$$

Figure 9D:
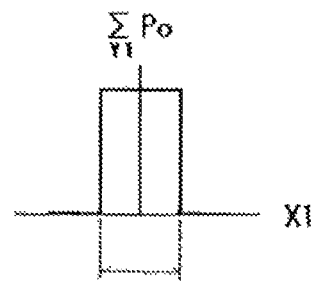
Figure 9H:
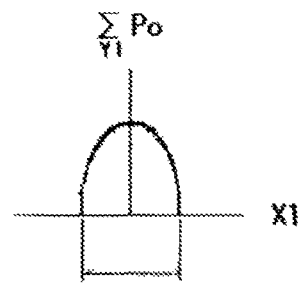

FIGS. 9D and 9H are light intensity distributions each of which is obtained by being converted into a one-dimensional array, where a vertical axis indicates a light intensity Pom(x1, z1) and a horizontal axis indicates an axis X1.

When the light emitting window 11 has a rectangular shape as illustrated in FIGS. 9A to 9D, the light intensity Pom(x1, z1) is, as represented by the following Expression (11), an uniform rectangular intensity distribution (a constant). In the expression, the width WL of the rectangular shape in the X-axis direction is equal to a+b (WL=a+b).

$$Pom(x1,z1)=Po1\times(a+b) \qquad (11)$$

On the other hand, when the light emitting window 11 has a circular shape as illustrated in FIGS. 9E to 9H, the light intensity Pom(x1, z1) is, as represented by the following Expression (12), a bell-shaped intensity distribution.

$$Pom(x1, z1) = Po1 \times 2 \times \sqrt{\left(\frac{WL}{2}\right)^2 - (x1)^2} \qquad (12)$$

Accordingly, the light intensity distributions on the light receiving element surface obtained by using the light sources illustrated in FIGS. 9A to 9H are represented as the following Expressions (13) and (14) by applying Expressions (11) and (12) to Expression (9), respectively.

$$I\_led(x2, z2, p, d, \lambda) = \int Po1 \times (a+b) \times I(x1, x2, z2, p, d, \lambda) dx1 \qquad (13)$$

$$I\_led(x2, z2, p, d, \lambda) = \qquad (14)$$
$$\int Po1 \times 2 \times \sqrt{\left(\frac{WL}{2}\right)^2 - (x1)^2} \times I(x1, x2, z2, p, d, \lambda) dx1$$

Embodiment 1

Next, Embodiment 1 of the present invention will be described. In the present embodiment, attention is focused on a harmonic component having a specific order in a light intensity distribution on a light receiving element surface, and a method of eliminating the component will be described. First of all, in the present embodiment, a case where the light source 10 has the rectangular-shaped light emitting window 11 as illustrated in FIGS. 9A to 9D and indicates a uniform light intensity distribution in a light emitting area will be described.

In the light intensity distribution on the light receiving element surface which is represented by the above Expression (13), in order to eliminate 3rd order components, only the 3rd order components may be extracted from Expression (13) to determine the shape of the light emitting window 11 so that its amplitude component becomes zero. In the expanded expression of the above Expression (7), combination terms of (0th order, +3rd order), (0th order, −3rd order), (+1st order, −2nd order), and (−1st order, +2nd order) are contributed to the 3rd harmonic component. A light intensity distribution of only the 3rd components $I_3(x1, x2, z2, p, d, \lambda)$ is represented as the following Expression (15).

$$I3(x1, x2, z2, p, d, \lambda) = u3m\ uu0 + u3p\ uu0 + \qquad (15)$$
$$u0\ uu3m + u0\ uu3p +$$
$$u2p\ uu1m + u2m\ uu1 +$$
$$u1p\ uu2m + u1m\ uu2p$$
$$= K \times \text{Cos}(2 \times \Pi \times 3 \times (x2-x1)/Pi)$$
$$= K \times \text{Cos}(\Pi \times 3 \times (x2-x1)/p)$$

$$Pi = 2Ps = 2P$$

In the expression, Pi is a fundamental cycle of an interference pattern which is formed on the light receiving element surface, and Ps is a grating pitch which corresponds to the first scale. K is an amplitude component of the 3rd components.

In the present embodiment, Pi=2×Ps is obtained since U=V is met, and the relationship of Ps=P is met as represented by the above Expression (15). Generally, a condition of eliminating a harmonic is determined on the basis of the pitch Pi of the interference pattern. Substituting Expression (15) into Expression (13), a shape of the light emitting window 11 in which the light intensity distribution $I_3(x1, x2, z2, p, d, \lambda)$ obtained by only the 3rd order components becomes zero regardless of a value of the position x2 on the light receiving element surface is the condition of eliminating the 3rd harmonic components. The condition is represented by the following Expression (16).

$$\int Po1\times(a+b)\times K\times\text{Cos}(\pi\times3\times(x2-x1)/p)dx1=0 \qquad (16)$$

In accordance with the above Expression (16), in the light source 10 having the rectangular-shaped light emitting window 11 and indicating the uniform light intensity distribution in the light emitting area as illustrated in FIGS. 9A to 9D, the condition of eliminating the 3rd order components is met when the width WL in the X-axis direction is 2P/3.

In addition, a general conditional expression for eliminating N-th order harmonic components when the rectangular-shaped light emitting window showing a uniform light intensity distribution is used is represented as the following Expression (17).

$$\int Po1\times(a+b)\times K\times\text{Cos}(\pi\times N\times(x2-x1)/p)dx1=0 \qquad (17)$$

In accordance with Expression (17), when the width WL of the rectangular shape in the X-axis direction is 2P/N, the condition of eliminating the N-th order components is met.

Next, the light source 10 which is provided with the circular-shaped light emitting window 11 indicating the uniform light intensity distribution in the light emitting area as illustrated in FIGS. 9E to 9H will be described. Also in this case, a shape of the light emitting window 11 in which a value of the light intensity distribution $I_3(x1, x2, z2, p, d, \lambda)$ obtained by only the 3rd order components becomes a constant, i.e. zero, regardless of a value of the position x2 is the condition of eliminating the 3rd harmonic components. The condition is represented by the following Expression (18).

$$\int Po1\times 2\times\sqrt{\left(\frac{WL}{2}\right)^2-(x1)^2}\times K\times\text{Cos}(\Pi\times 3\times(x2-x1)/p)dx1 = 0 \qquad (18)$$

In accordance with Expression (18), in the light source 10 having the circular-shaped light emitting window 11 and indicating the uniform light intensity distribution, the condition of the shape of the light emitting window 11 for eliminating the 3rd order components is that the light emitting window 11 has a diameter WL of 0.813×p μm (the grating pitch Ps of the first scale is equal to p). In this case, the following Expression (19) is met.

$$\int Po1 \times 2 \times \sqrt{\left(\frac{WL}{2}\right)^2 - (x1)^2} \times K \times \text{Cos}(\Pi \times N \times (x2 - x1)/p) dx1 = 0 \quad (19)$$

In accordance with Expression (19), when the diameter WL of the circular-shaped light emitting window 11 is 2P/N, the condition of eliminating the N-th order components is met.

There are a plurality of solutions which meet the above Expressions (17) and (19), and the results are described in the following Table 1. Table 1 describes a relationship between the shape of the light emitting window 11 and the order of the harmonic components which is eliminated. In this case, the intensity distribution in the light emitting window 11 is uniform.

TABLE 1

| ORDER OF HARMONIC COMPONENT TO BE ELIMINATED | WIDTH WLrec. OF RECTANGULAR SHAPE IN X-AXIS DIRECTION | DIAMETER WLcir. OF CIRCULAR SHAPE | SIZE RATIO OF DIAMETER WLcir. TO WIDTH WLrec. |
|---|---|---|---|
| SECOND ORDER | (2/2) × n × Ps = 1.00 × n × Ps | 1.220 × n × Ps | 1.22 |
| THIRD ORDER | (2/3) × n × Ps = 0.667 × n × Ps | 0.813 × n × Ps | 1.22 |
| FOURTH ORDER | (2/4) × n × Ps = 0.500 × n × Ps | 0.610 × n × Ps | 1.22 |
| FIFTH ORDER | (2/5) × n × Ps = 0.400 × n × Ps | 0.487 × n × Ps | 1.22 |
| N-TH ORDER | (2/N) × n × Ps | . . . | 1.22 |

The calculation result of the present embodiment is obtained on condition that the relationship of Pi=2·Ps=2×p is met because of U=V. However, the size used when the general N-th order component is eliminated is a width WLrec. of (1/N)×n×Pi in the rectangular shape, or a diameter WLcir. Of 1.22×(1/N)×n×Pi. In this case, the near-field light intensity distribution in the light emitting window 11 is uniform.

As described in Table 1, when the circular-shaped light emitting window is adopted, the diameter value WLcir. having a value 1.22 times as much as the width WLrec. of the rectangular-shaped light emitting window in a displacement measuring direction is provided. However, actually, considering the nonuniformity of the light intensity distribution in the near field in the light emitting window, the shape and the size of the light emitting window needs to be determined. In particular, when a current confinement-type LED is used, as illustrated in FIGS. 1C and 1D, the light intensity tends to be strong in the peripheral portion of the light emitting window and to be weak at the center portion of the window. In this case, the optimum size of the light emitting window is smaller than the size WLrec. and WLcir. described in the above table.

According to the present embodiment, even if a light source in which a light intensity distribution is nonuniform in a light emitting window is used, a harmonic having a specific order can be effectively eliminated.

Embodiment 2

Next, Embodiment 2 of the present invention will be described. FIGS. 1A to 1B are configuration diagrams and FIGS. 1C to 1E are characteristic diagrams of an optical encoder (a triple grating measurement system) in Embodiment 2 of the present invention.

First of all, referring to FIG. 1A, an entire configuration of the optical encoder in the present embodiment will be described. FIG. 1A is a perspective view illustrating the configuration of the reflective-type optical encoder in the present embodiment. In the drawing, a reflective scale 20 is adhesively fixed on a scale supporting body (not shown) by using a double-faced tape (not shown), and a pitch Ps of a diffraction grating formed on the reflective scale 20 is set to 64 μm. In the optical encoder of the present embodiment, a detection head 40 is disposed so as to face the reflective scale 20. The detection head 40 is mainly constituted of a light source 10 including a current confinement-type LED element and a photo IC element 30 (a light receiving element) that is a semiconductor device embedded with a light receiving element and a signal processing circuit. Hereinafter, referring to FIGS. 1A to 3D, each of the light source 10, the photo IC element 30, the detection head 40, and the reflective scale 20 will be described.

FIG. 1B is a diagram illustrating the LED element (the light source 10) having a current confinement structure. A light emitting window 11 is an effective light emitting window having a circular shape with a diameter WL. The light source 10 is provided with an electrode 12 and a wire 13. A central wavelength of light emitted from the circular-shaped light emitting window 11 is for example 650 nm. FIG. 1C is a characteristic diagram of a near-field light intensity Po(x, y) on the S-S cross section (y=0) in FIG. 1B. FIG. 1D is a characteristic distribution diagram of the near-field light intensity Po(x, y), which is illustrated by a perspective view, and an area of a sum (ΣPo(x)) of the light intensity in a Y-axis direction is illustrated in the drawing. FIG. 1E is a characteristic diagram illustrating the relationship between the sum (ΣPo(x)) of the light intensity and the coordinate X.

Figure 8A:
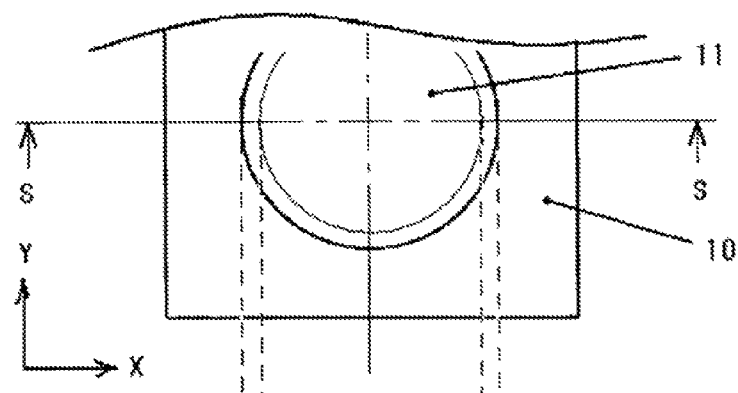
FIGS. 8A and 8B are configuration diagrams of a light source in Embodiment 2.
Figure 8B:
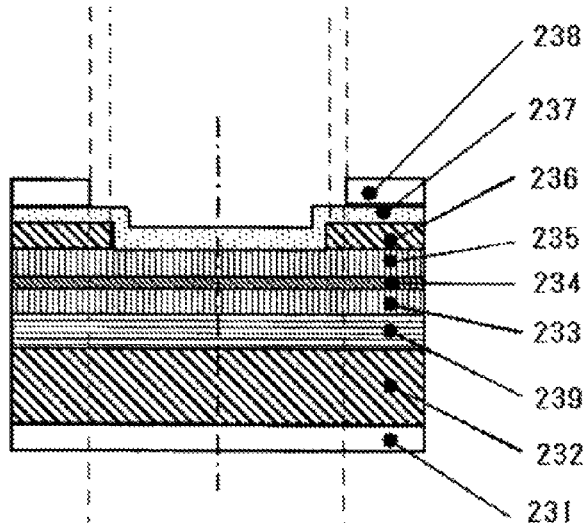
Figure 8C:
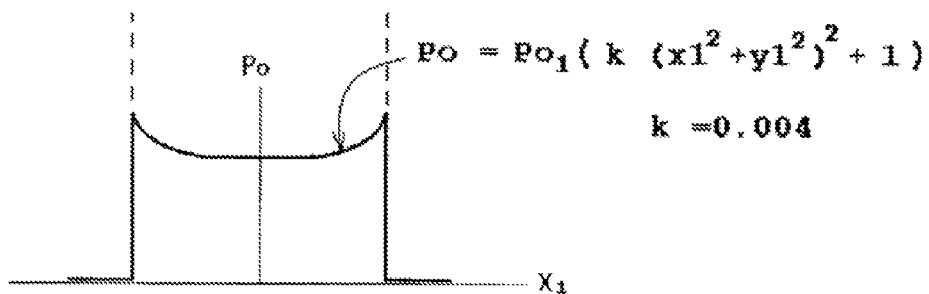
FIG. 8C is a characteristic diagram of a light source in Embodiment 2.

Next, referring to FIGS. 8A to 8C, the structure and the characteristic of the current confinement-type LED element (the light source 10) will be described in detail. FIGS. 8A and 8B are configuration diagrams and FIG. 8C is a characteristic diagram of the light source 10 in the present embodiment. FIG. 8A is an enlarged diagram of the light emitting window 11 of the light source 10, and FIG. 8B is an inner configuration diagram on the S-S cross section in FIG. 8A. As illustrated in FIG. 8B, crystal growths in order of a multi-layer reflective coating layer 239, a first clad layer 233, an active layer 234, a second clad layer 235, a block layer 236, and a Zn (zinc) diffused layer 237 are performed on a substrate 232. Then, a lower electrode 231 is evaporated on a lower surface of the substrate 232, and an upper electrode 238 is evaporated on an upper surface of the block layer 236 to form the light source 10 in the present embodiment.

The substrate 232 is for example a compound semiconductor having a thickness of around 150 to 250 μm. The light source 10 of the present embodiment includes a current confinement structure for taking out the light generated in the active layer 234 from a side of the second clad layer 235 by applying operational current in a predetermined region between the substrate 232 and the second clad layer 235. Furthermore, the light source 10 of the present embodiment includes a multi-layer reflective coating layer 239 for improving the efficiency of taking out the light is included, and the light to a lower surface side of the substrate 232, generated in the active layer 234, is introduced to the side of the second clad layer 235 to be able to heighten the power.

Generally, the light intensity distribution of the LED (the light source 10) depends upon the carrier density distribution injected into the active layer, and is determined by the current density distribution inside the LED. In particular, the current confinement-type LED forms a region which limits the current inside it and is configured so that the carrier is injected into only the active layer immediately beneath the light emitting window. The intensity distribution of the light emitted from the light emitting window reflects the current density distribution in a portion of the active layer substantially immediately beneath it.

FIG. 8C illustrates a near-field light intensity distribution on the S-S cross section in FIG. 8A. Since the distances from the upper electrode 238 to the center portion and to the peripheral portion of the light emitting window 11 are different from each other, the current distribution flowing in the active layer 234 immediately beneath the light emitting window 11 is not even, and therefore the light intensity distribution is not uniform.

In the present embodiment, differently from Embodiment 1 described above, the light intensity distribution in the light emitting window is not uniform. Therefore, the present embodiment is described using the following general expression (Expression (20)) which represents the relationship between the light intensity distribution inside the light emitting window 11 and the light intensity distribution on the light receiving element surface.

$$I(x2) = \iint Po(x1,y1) \times I(x1,x2) dy1 dx1 \quad (20)$$

In the expression, I(x2) denotes a light intensity distribution in an X2-axis direction on the light receiving element surface, and Po(x1, y1) denotes a near-field light intensity distribution of the light emitting window 11. I(x1, x2) is a term which represents an interference pattern generated based on the principle of the triple grating measurement system.

In order to eliminate N-th order harmonic components contained in the light intensity distribution represented by I(x2), a shape of a light emitting window S which meets the relationship of the following Expression (21) is determined.

$$\int_S \int Po(x1, y1) \text{Cos}(\Pi \times N \times (x2 - x1)/p) dy1 dx1 = 0 \quad (21)$$

In the embodiment, in order to eliminate the 3rd order harmonic component, the above Expression (21) is represented as the following Expression (22) on the condition that N is equal to 3.

$$\int_S \int Po(x1, y1) \text{Cos}(\Pi \times 3 \times (x2 - x1)/p) dy1 dx1 = 0 \quad (22)$$

Figure 10A:
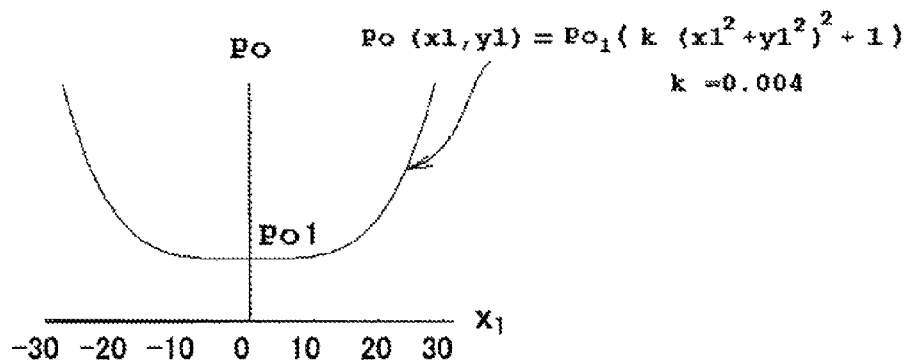
FIGS. 10A to 10C are diagrams illustrating light intensity distributions of an actual current confinement-type LED in Embodiment 2.
Figure 10B:
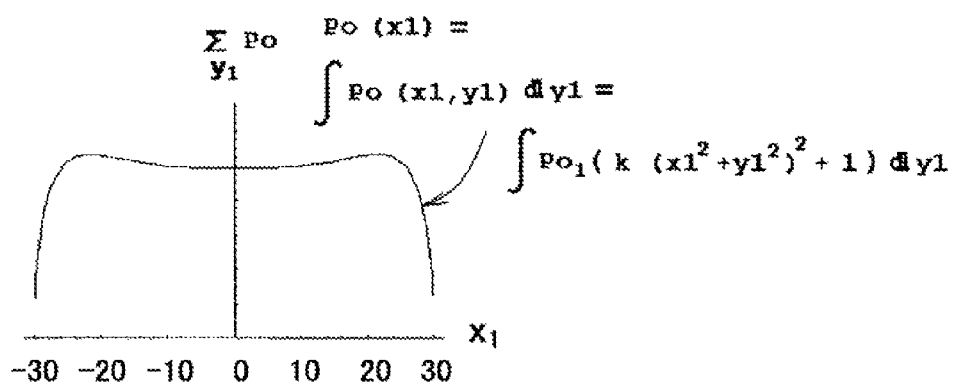

The light emitting window 11 of the present embodiment, as illustrated in FIG. 8C, has a nonuniform light emitting characteristic of a bathtub shape, and its light intensity distribution function is as illustrated in FIG. 10A. Po(x1) obtained by integrating the light intensity distribution function illustrated in FIG. 10A in a Y-axis direction (dy1) is a distribution as illustrated in FIG. 10B.

Figure 10C:
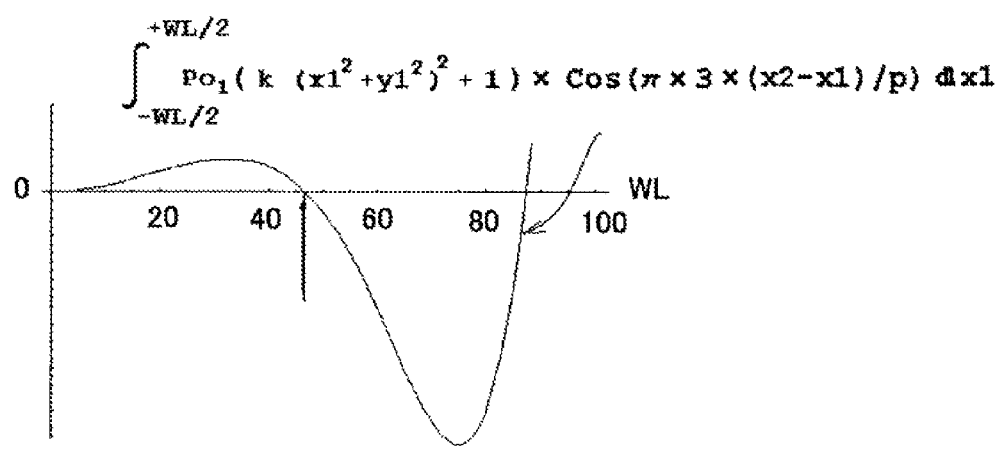

The condition for eliminating the 3rd order harmonic is a case in which a value of the expression indicated in FIG. 10C becomes zero. In the present embodiment, a value of the constant k=0.004 identified based on the actual bathtub-type distribution is substituted. FIG. 10C illustrates the condition of the change, where a horizontal axis indicates a diameter WL of the circular-shaped light emitting window and a vertical axis indicates a value of the expression in FIG. 10C. There are a plurality of points that show a value of zero in the left-hand side. In a range illustrated in FIG. 10C, WL1 (=47.00 μm) and WL2 (=87.33 μm) are diameters of the circular-shaped light emitting window capable of eliminating the 3rd order harmonic component. The vertical axis in FIG. 10C indicates the largeness of the 3rd order harmonic component, and in a case where WL2 is used as a size of the light emitting window, the 3rd order component significantly remains when an error of the size is generated. In this case, WL is a preferable size.

Figure 14:
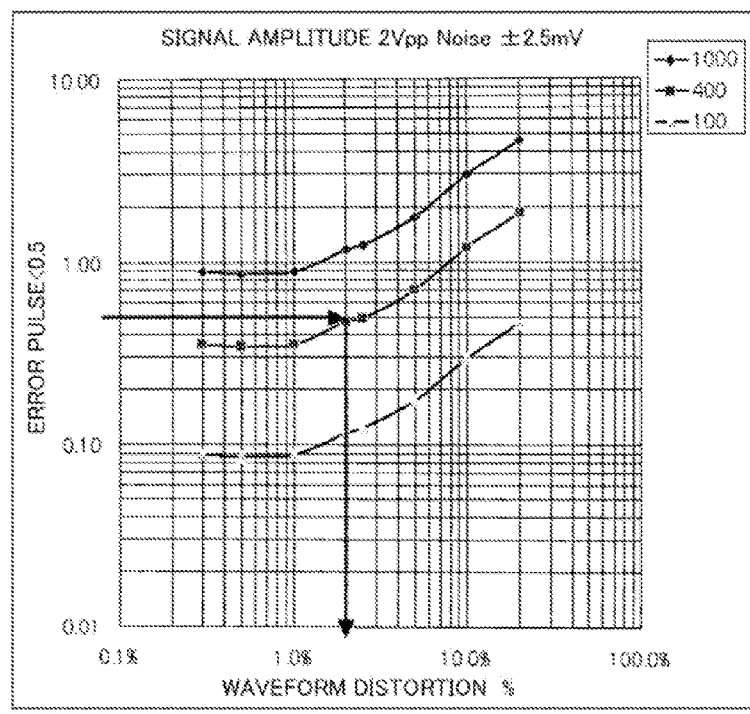
FIG. 14 is a result of a relationship between an interpolation error and a waveform distortion ratio (a harmonic amplitude/a fundamental wave amplitude), which is obtained by a desktop calculation.

As described above, according to the present embodiment, even if a light emitting portion has a nonuniform light intensity distribution, a shape and a size of a light emitting window can be determined with high accuracy. The shape and the size of the light emitting window S are determined so as to meet the above Expression (21). FIG. 14 is a result of a relationship between an interpolation error and a waveform distortion ratio (a harmonic amplitude/a fundamental wave amplitude), which is obtained by a desktop calculation. According to the result, when a signal interpolation up to around 400 divisions is considered, in order to suppress the interpolation error in ±0.5 pulse, the amplitude ratio of the harmonic order (N) components (the wave distortion ratio) with respect to the amplitude of the fundamental wave (the order N=1) needs to be equal to or less than around 2% (0.02). According to the result illustrated in FIG. 14, the acceptable range of the wave distortion ratio (a harmonic amplitude/a fundamental wave amplitude) is represented as the following Expression (23).

$$0 \leq \frac{\int_S \int Po(x1, y1) \cdot \text{Cos}(\Pi \times N \times (x2 - x1)/p) dy1 dx1}{\int_S \int Po(x1, y1) \cdot \text{Cos}(\Pi \times (x2 - x1)/p) dy1 dx1} \leq 0.02 \quad (23)$$

In the expression, S is an entire region of the light emitting window that is the integration range, and Po(x1, y1) is a function which represents a near-field light intensity distribution at the XY coordinate (x1, y1) of the light emitting window. Furthermore, p is a grating pitch of the scale, N is a specific order (N: 1, 2, 3, . . . ) of the harmonic component, and x2 is an axis in a displacement detecting direction on the light receiving element surface.

Specifically, for example, when the pitch of the movable scale is 20 μm to generate a signal of 400 times by an electric interpolating portion, the detection resolution is 0.05 μm. If the shape of the light emitting window is determined in the acceptable range of the above Expression (23), the interpolation pitch accuracy of ±0.025 μm can be ensured. The wave distortion ratio (the acceptable range) represented by Expression (23) is applicable to Embodiment 1 described above and Embodiment 3 described below as well as the present embodiment.

Figure 2B:
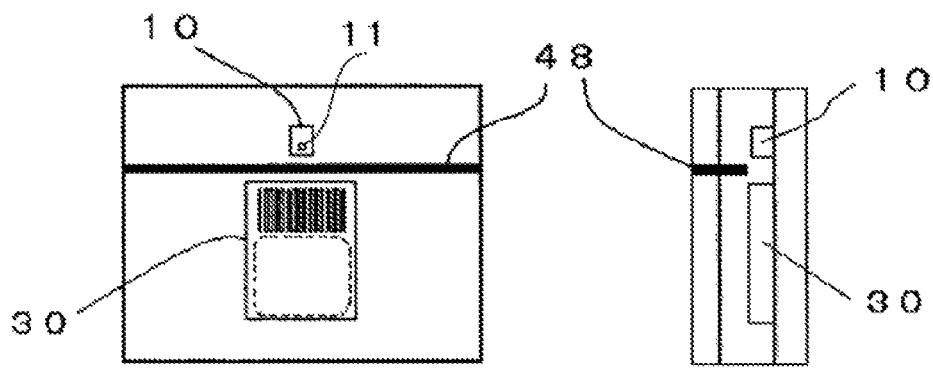
Figure 2C:
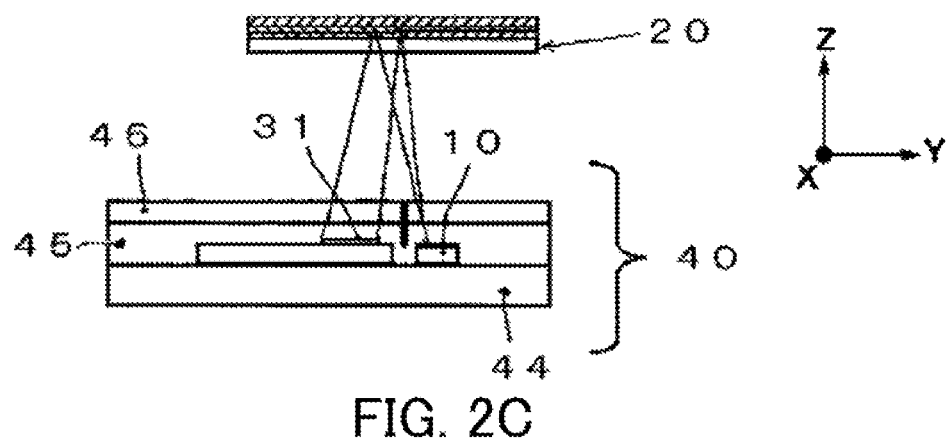

FIGS. 2A to 2C are configuration diagrams of a photo IC element in the present embodiment. As illustrated in FIG. 2A, a photo IC element 30 is disposed under the light source 10 that is a light emitting portion. In the drawing, the photo IC element 30 is constituted of a light receiving element portion 31 disposed at a side closer to the light source 10 and a signal processing circuit portion 39 (a signal processing circuit).

The light receiving element portion 31 has sixteen photo diodes 32a, 32b, . . . , 35c, and 35d arranged at regular intervals in a horizontal direction in the drawing.

In the present embodiment, an interference pattern whose fundamental cycle λ (=128 μm) is twice as long as a fundamental cycle Ps (=64 μm) of the grating on the reflective scale 20 is formed on the light receiving element surface. When the reflective scale 20 is moved by the fundamental cycle Ps of the grating, the interference pattern is moved by Pi in the same direction on the light receiving element surface. The photo IC element 30 (the light receiving element) is provided with light receiving element groups 32, 33, 34, and 35 arranged at fundamental pitches Pd so as to detect the fundamental cycle Pi of the interference pattern (Pi=Pd). The sixteen photo diodes (light receiving elements as minimum units) are arranged at Pd/4 pitches, i.e. 32 μm. Each light receiving element group is constituted of four photo diodes containing two photo diodes which obtain A phase and B phase output signals whose phases are shifted by 90 degrees from each other and the other two photo diodes which obtain AB phase and BB phase output signals whose phases are shifted by 180 degrees from those of the A phase and B phase, respectively. These four photo diodes are denoted as A+, B+, A−, and B− phases, and correspond to photo diodes 32a, 32b, 32c, and 32d in the drawing, respectively. In the present embodiment, four light receiving element groups 32, 33, 34, and 35 are arranged. The same phase signals of the light receiving element groups are electrically connected with each other in order to obtain a sum of them.

In accordance with the arrangement of the light receiving elements as above, the output currents having the A+, B+, A−, and B− phases which are shifted by 90 degrees can be obtained along with the movement of the reflective scale 20. After these are converted into voltage values by a current-voltage converter, the voltages of the A+ and A− phases and the voltages of the B+ and B− phases are inputted to a differential amplifier to output signals as two-phase analog displacement output signals having A phase and B phase which are shifted by 90 degrees. The signal processing circuit portion 39 (including a push-pull circuit) embedded in the light receiving element (the photo IC element) performs a predetermined signal processing to eliminate direct current components and harmonic components having even orders contained in the four-phase signals that are the output signals of the light receiving element.

In the present embodiment, in order to improve a position detecting resolution, an additional portion (not shown) performs an arctangent calculation of a sine wave signals having A and B phases to obtain an arctangent value to calculate a phase angle. The additional portion is, for example, constituted of an A/D converter and a memory which stores a look-up table.

In the present embodiment, an amplitude error, a phase error, and an offset in the A- and B-phase sine wave signals are digitally corrected. However, a displacement (a waveform distortion) from an ideal waveform of the sine wave signal exists also in the corrected sine wave signal. In particular, the waveform distortion significantly depends upon the interval displacement between the detection head 40 and the reflective scale 20, and most of the waveform distortion is caused by harmonic components.

In the present embodiment, as described above, the light emitting window of the light source 10 has a predetermined shape to eliminate the 3rd order harmonic component. In addition, the signal processing circuit portion 39 (the differential circuit) described above effectively eliminates the even-order harmonic components. Therefore, odd-order components having orders of five or more are dominant as remaining harmonic components contained in the output signal.

Figure 11:
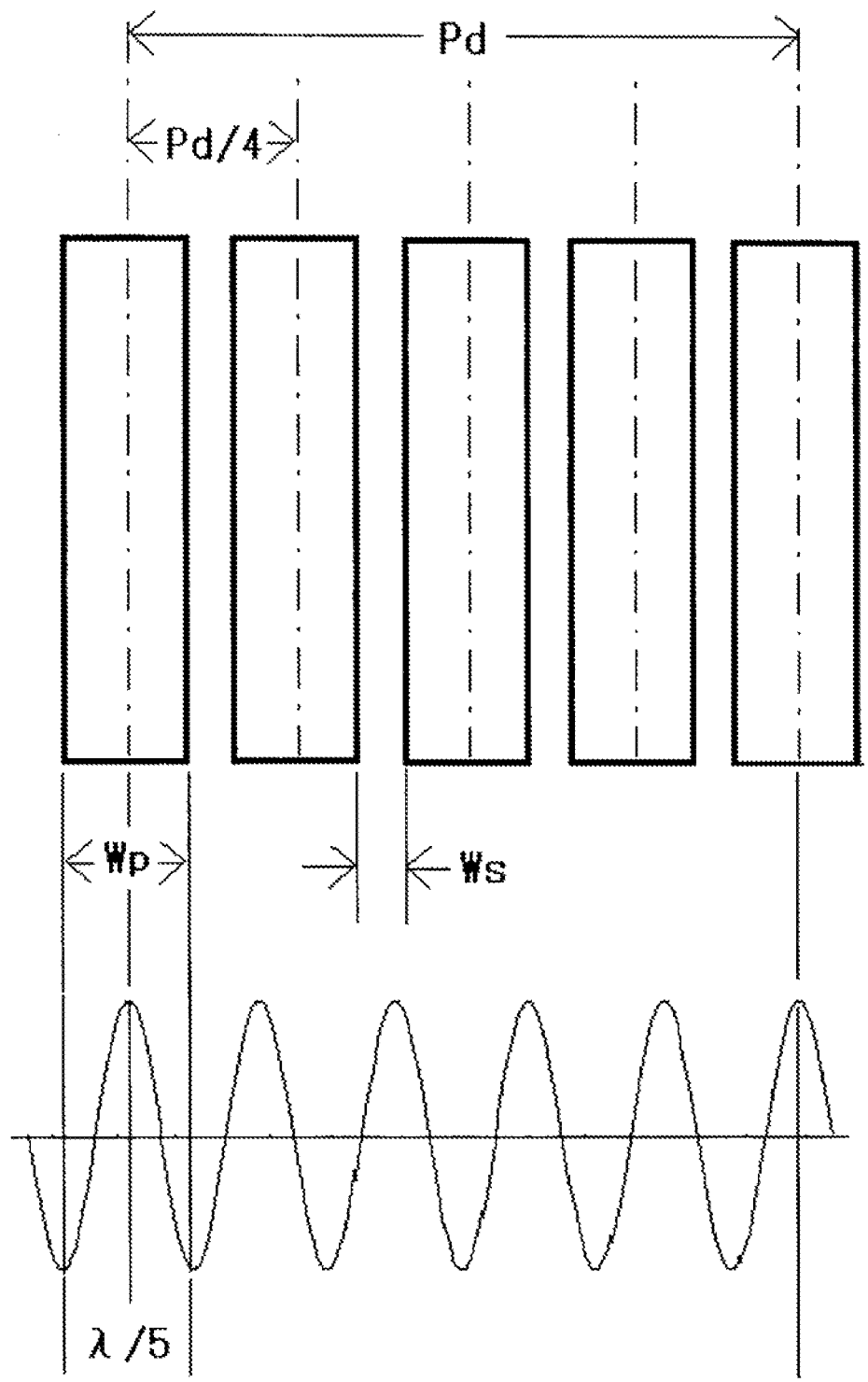
FIG. 11 is a diagram illustrating a shape of a light receiving window of a light receiving element in Embodiment 2.

FIG. 11 is a diagram illustrating a shape of a light receiving window of the light receiving element (the photo IC element 30) in the present embodiment. As illustrated in FIG. 11, in the shape of the light receiving window of the light receiving element, in order to eliminate the 5th order harmonic component, a width (Wp in the drawing) of the effective light receiving window is set to Pi/5. In the present embodiment, the fundamental cycle Pi of the interference pattern formed on the light receiving surface is 128 μm. Therefore, in the present embodiment, the width Wp of the light receiving window is set to 25.6 μm (=128/5), and a width Ws of a dead zone portion between each light receiving window is set to 6.4 μm.

Thus, the size Wp of the light receiving window portion is set to Pi/5, i.e. a spatial cycle of the 5th order harmonic component and the width Wp of the light receiving window are set to be widths having the same value to always maintain an integral light intensity of the 5th order harmonic component constant. Therefore, the 5th order harmonic component can be effectively eliminated from the waveform of the output signal. Furthermore, according to the present embodiment, a sufficient size margin is given between edge portions of the light receiving window (Ws in the drawing). Therefore, the distortion of the waveform caused by crosstalk from an adjacent light receiving signal source and the deterioration of the position detecting accuracy of the encoder caused by the offset error can be prevented.

Thus, the width Wp of each of the plurality of light receiving windows is, in order to eliminate the 5th order harmonic component, set to ⅕ of the fundamental cycle of the interference pattern formed on the light receiving element surface. However, in order to eliminate the harmonic component having the order of five or more, the width Wp may also be set to 1/M (M≧5) of the fundamental cycle of the interference pattern.

FIGS. 2B and 2C are diagrams illustrating a package which seals the photo IC element 30. FIG. 2B illustrates a light shielding wall 48 disposed so that luminous flux propagating the package from the light emitting window 11 of the light source 10 does not directly enter the light receiving element portion 31. FIG. 2C illustrates each cross section of the detection head 40 and the reflective scale 20 and a simple optical path. The detection head 40 is constituted of a wiring substrate 44, a transmissive sealing resin 45 which seals the light source 10 and the photo IC element 30, and a transmissive glass 46 disposed on the sealing resin 45 in addition to the light source 10 and the photo IC element 30.

Figure 3A:
FIGS. 3A to 3D are diagrams illustrating a reflective scale in Embodiment 2.
Figure 3B:
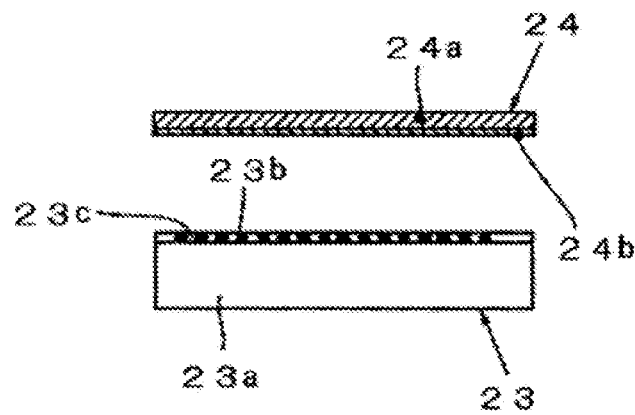

Next, referring to FIGS. 3A to 3D, the reflective scale 20 of the present embodiment will be described. As illustrated in FIG. 3B, the reflective scale 20 is constituted of a pattern forming sheet 23 and a reflective-layer forming sheet 24. The pattern forming sheet 23 is, for example, an industrial photoengraving film, which is made of a material of a transmissive PET film. The thickness of the material is around 0.1 to 0.2 mm, and necessary patterns are formed through processes of an exposure and a development by an emulsion layer provided on a surface layer of the industrial photoengraving film. A pattern of an antireflective portion 23b that is a light absorbing portion and a pattern of a light transmissive portion 23c are alternately disposed on a base material portion 23a of the pattern forming sheet 23.

Figure 3C:
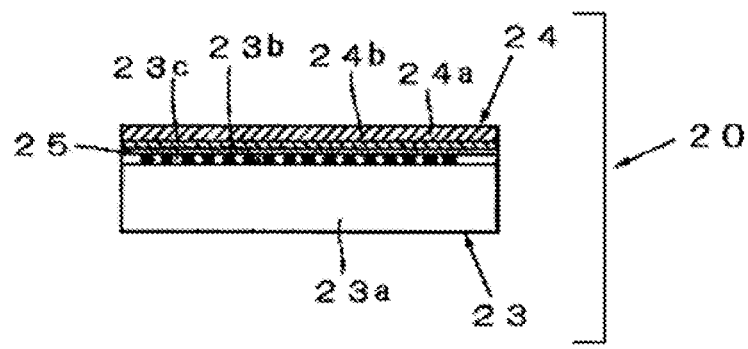

On the other hand, in the reflective-layer forming sheet 24, a reflective layer 24b made of an evaporation film is formed on a lower surface of the reflective layer 24a made of a PET film that is a base material. As illustrated in FIG. 3C, the reflective scale 20 has a structure formed by bonding the pattern forming sheet 23 and the reflective-layer forming sheet 24 with an adhesive layer 25 made of transmissive adhesive.

Figure 3D:
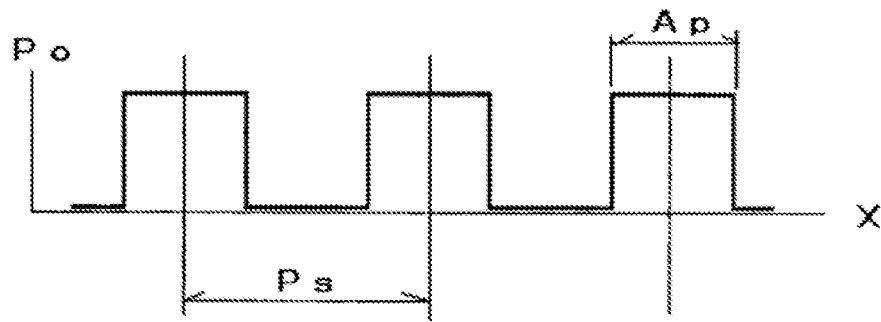

In the present embodiment, as the pattern forming sheet 23, a rectangular wave amplitude grating whose size ratio of the antireflective portion 23b of the light absorbing portion and the light transmissive portion 23c (hereinafter, referred to as an opening ratio of the reflective scale) is one to one (1:1) is formed. As illustrated in FIG. 3D, when a displacement detecting direction is an X-axis, a reflective light intensity distribution in a near field of the scale shows a rectangular-shaped distribution of AP/Ps=50%. The reflective scale 20 of the present embodiment has a thickness of around 0.1 to 0.3 mm and has flexibility and is also capable of being mounted with curvature on an inner or outer side surface of a cylinder body. Therefore, an expansion to various kinds of usages is possible.

In the present embodiment, an effective light emitting diameter is determined in accordance with the characteristic of the light intensity distribution in the light emitting window of the light source to effectively eliminate the 3rd order harmonic component. Furthermore, the size Wp of the light receiving window of the light receiving element is set so as to have a width corresponding to $1/5$ (1/M) of the fundamental cycle Pi of the interference pattern projected onto the light receiving surface to effectively eliminate the 5th order harmonic component (M-th order harmonic component). In this case, each width of the plurality of light receiving windows is set so as to have a length of 2/M (M≧5) of the grating pitch of the reflective scale 20.

Additionally, a signal processing method using a differential circuit (a push-pull circuit) for four-phase signals is performed for effectively eliminating the even-order harmonic components. Thus, in the present embodiment, harmonic components to be eliminated are divided by order for each portion of components of the light source portion, the light receiving portion, and the signal processing portion, and the harmonic components can be effectively eliminated with high accuracy using a different method in accordance with each portion. Therefore, an analog output signal of an ideal sine wave can be obtained, and a position can be detected with high resolution and with high accuracy when an electric interpolating portion is applied. Furthermore, according to the present embodiment, a small-sized optical encoder can be provided at low cost.

Embodiment 3

Figure 12A:
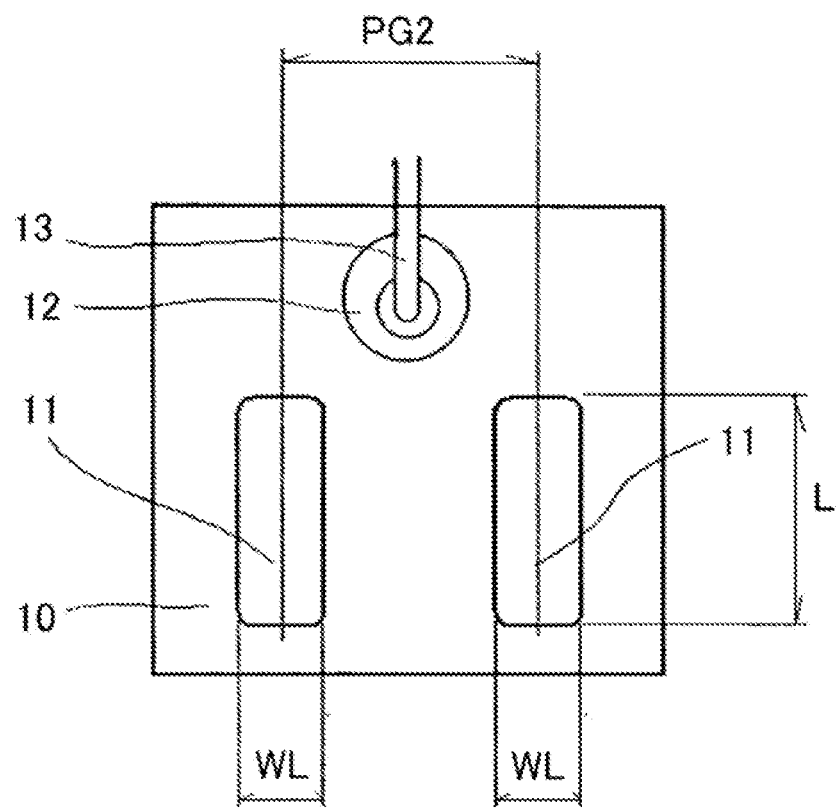
FIGS. 12A and 12B are diagrams of light sources each of which is provided with a plurality of light emitting windows in an optical encoder in Embodiment 3.
Figure 12B:
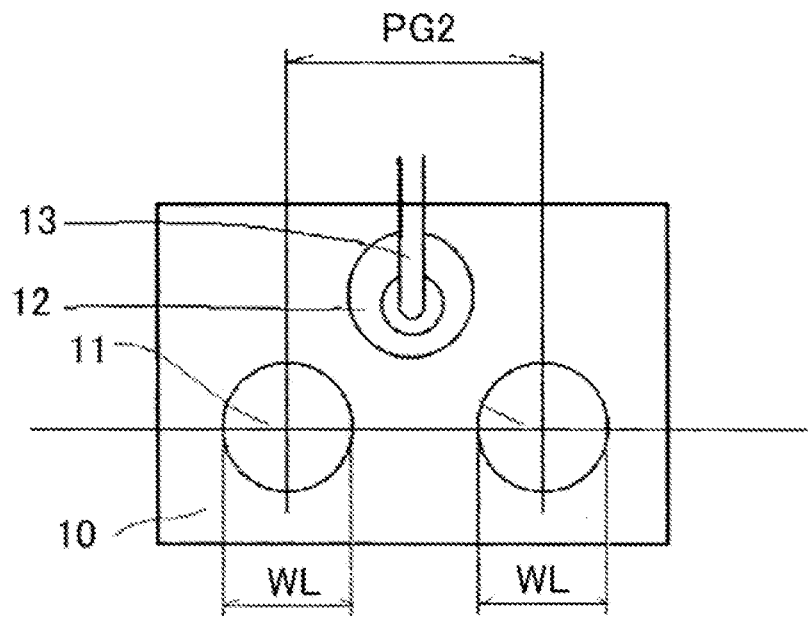

Next, Embodiment 3 of the present invention will be described. FIGS. 12A and 12B are diagrams illustrating a light source 10 (an LED light source) having a plurality of light emitting windows 11 in an optical encoder of the present embodiment. FIG. 12A illustrates a light source having a plurality of rectangular-shaped light emitting windows, and FIG. 12B illustrates a light source having a plurality of circular-shaped light emitting windows. In the present embodiment, the plurality of light emitting windows 11 are arranged at intervals (a grating pitch of PG2) twice as long as the grating pitch Ps of the first scale. As a width WL (FIG. 12A) or a diameter WL (FIG. 12B) of one light emitting window 11, the same value as that of Embodiments 1 and 2 described above is applied to be able to eliminate harmonic components.

Figure 13:
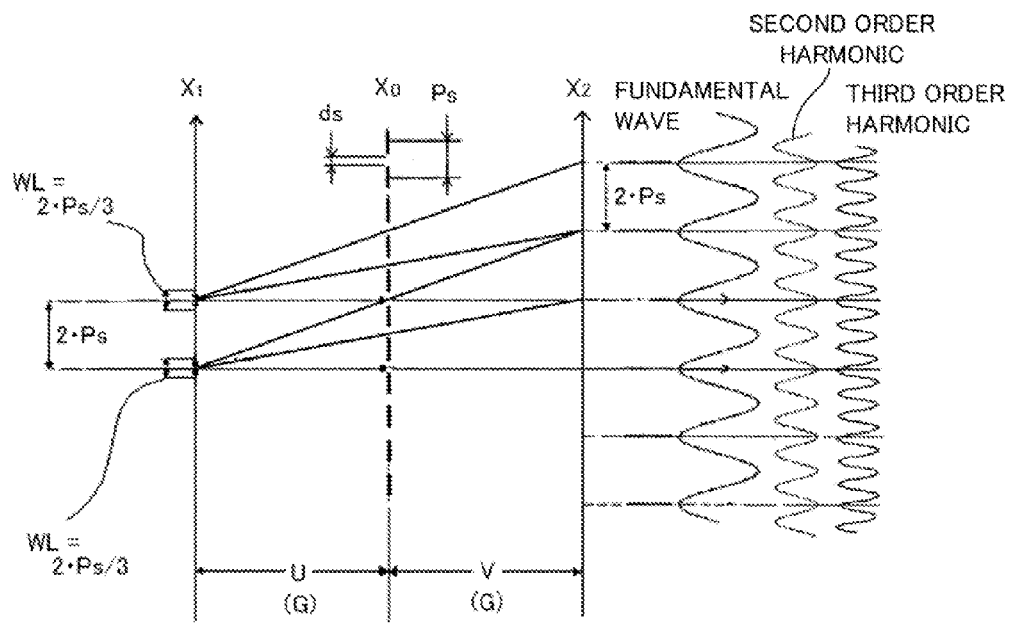
FIG. 13 is an equivalent optical system of an optical encoder when a light source of Embodiment 3 is used.

FIG. 13 is a diagram illustrating an equivalent optical system of the optical encoder when the light source of the present embodiment is used. When a distance between centers of the plurality of light emitting windows 11 is set to 2×Ps, phase relationships in light intensity distributions on the light receiving element surface are overlapped. Therefore, the same light intensity distribution as that obtained by disposing a single light emitting window 11 is formed on the light receiving element surface. Thus, also in the optical encoder having the plurality of light emitting windows 11, the same effect as that of Embodiments 1 and 2 described above can be obtained.

According to the present invention, the shape of the light source and the intensity distribution in the light emitting window as described in Embodiments 1 and 2, or the number of the light emitting windows described in Embodiment 3 is not necessarily a limitation of the invention, and distortions of an arbitrary harmonic can be eliminated if the light source meets the conditional expression represented by Expression (23).

Each of the optical encoders of Embodiments 1 to 3 described above is configured so as to eliminate harmonic components contained in the output signal, but the present invention is not limited to this. Contrary to Embodiments 1 to 3, the optical encoder can also be configured so as to leave a specific harmonic component to obtain a triangular-shaped output signal. For example, the shape of the light emitting window of the light source is determined so as to eliminate the 2nd order component and also the shape of the light receiving window (the width of the light receiving element) is determined so as to leave odd-order components to be able to positively leave the odd-order components to make the output signal of a triangular wave. In particular, when a signal component having a superior linearity is partially selected from the output signal to apply an electric interpolation method such as a method of performing position detection by an interpolating calculation of the signal component, the accuracy of the shape of the output signal of the triangular wave is important.

In each of Embodiments 1 to 3 described above, a reflective-type optical encoder is described, but the present invention is not limited to this, and is also applicable to for example a transmissive-type optical encoder. Furthermore, in each of Embodiments 1 to 3, the case in which the second scale and the third scale are configured integrally with the light source and the light receiving portion, respectively, is described, but the present invention is not limited to this. The present invention is also applicable to a case in which the second scale is configured separately from the light source, or a case in which the third scale is configured separately from the light receiving portion.

According to each of the above embodiments, a small-sized and highly-accurate optical encoder can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-210607, filed on Sep. 11, 2009, which is hereby incorporated by reference herein in its entirety.

What is claimed is:

1. An optical encoder comprising:
   a light source;
   a scale disposed so as to face the light source;
   a light receiving element configured to receive luminous flux from the light source through the scale; and
   a signal processing circuit configured to process an output signal of the light receiving element, wherein a light emitting window of the light source is constituted of a collection of a plurality of point light sources and has a shape which meets the following expression:

$$0 \leq \frac{\iint_S Po(x1, y1) \cdot \text{Cos}(\Pi \times N \times (x2 - x1)/p) dy1 dx1}{\iint_S Po(x1, y1) \cdot \text{Cos}(\Pi \times (x2 - x1)/p) dy1 dx1} \leq 0.02$$

where S is an entire region in the light emitting window that is an integration range, Po(x1, y1) is a function representing a light intensity distribution in a near field at an XY coordinate (x1, y1) of the light emitting window, p is a grating pitch of the scale, N is a specific order of a harmonic component (N: 1, 2, 3, . . . ), and x2 is an axis in a displacement detecting direction on a surface of the light receiving element.

2. An optical encoder according to claim 1, wherein:
the light receiving element has a plurality of light receiving windows, and
a width of each of the plurality of light receiving windows is set to 1/M of a fundamental cycle of an interference pattern which is formed on the surface of the light receiving element, where M is an integer that is 5 or more.

3. An optical encoder according to claim 1, wherein the light source is a current confinement-type LED.

4. An optical encoder according to claim 1, wherein:
the signal processing circuit includes a push-pull circuit,
the push-pull circuit eliminates an even-order harmonic component from the output signal,
the light receiving element has a plurality of light receiving windows,
wherein a width of each of the plurality of light receiving windows is set to a length of 2/M of a grating pitch of the scale to eliminate an M-th order harmonic component from the output signal, where M is an integer that is 5 or more,
the light source is a current confinement-type LED, and
the light emitting window of the light source has the shape which meets the expression to eliminate a 3rd harmonic component from the output signal.

5. An optical encoder according to claim 2, wherein a component reduced by the plurality of light receiving windows is an M-th order harmonic component of the output signal.

6. A displacement measuring apparatus comprising:
a moving object; and
an optical encoder that measures a position of the object, wherein the optical encoder includes:
a light source;
a scale disposed so as to face the light source;
a light receiving element configured to receive luminous flux from the light source through the scale; and
a signal processing circuit configured to process an output signal of the light receiving element,
wherein a light emitting window of the light source is constituted of a collection of a plurality of point light sources and has a shape which meets the following expression:

$$0 \leq \frac{\iint_S Po(x1, y1) \cdot \text{Cos}(\Pi \times N \times (x2 - x1)/p) dy1 dx1}{\iint_S Po(x1, y1) \cdot \text{Cos}(\Pi \times (x2 - x1)/p) dy1 dx1} \leq 0.02$$

where S is an entire region in the light emitting window that is an integration range, Po(x1, y1) is a function representing a light intensity distribution in a near field at an XY coordinate (x1, y1) of the light emitting window, p is a grating pitch of the scale, N is a specific order of a harmonic component (N: 1, 2, 3, . . . ), and x2 is an axis in a displacement detecting direction on a surface of the light receiving element.

* * * * *